US010932139B2

(12) United States Patent
Tran et al.

(10) Patent No.: US 10,932,139 B2
(45) Date of Patent: Feb. 23, 2021

(54) PRECISE ACCESS POINT PLACEMENT AND LOCATION MEASUREMENT

(71) Applicant: Cisco Technology, Inc., San Jose, CA (US)

(72) Inventors: Huy Phuong Tran, Portland, OR (US); Abhishek Mukherji, Fremont, CA (US); Edmund Cameron Duhaime, San Jose, CA (US); Rong Peng, Los Altos, CA (US); Santosh Ghanshyam Pandey, Fremont, CA (US); Jacob Earl Fussell, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 3 days.

(21) Appl. No.: 16/178,042

(22) Filed: Nov. 1, 2018

(65) Prior Publication Data

US 2020/0145837 A1  May 7, 2020

(51) Int. Cl.
*H04W 4/33* (2018.01)
*H04W 88/08* (2009.01)
*H04W 16/20* (2009.01)

(52) U.S. Cl.
CPC ............ *H04W 16/20* (2013.01); *H04W 4/33* (2018.02); *H04W 88/08* (2013.01)

(58) Field of Classification Search
None
See application file for complete search history.

(56) References Cited

U.S. PATENT DOCUMENTS

| 9,301,100 | B1* | 3/2016 | Jampani | G01S 5/0278 |
| 9,310,463 | B2 | 4/2016 | Pandey | |
| 2013/0257657 | A1* | 10/2013 | Garin | G01C 21/206 |
| | | | | 342/451 |
| 2015/0312774 | A1* | 10/2015 | Lau | H04W 16/20 |
| | | | | 455/446 |
| 2016/0088440 | A1* | 3/2016 | Palanki | H04W 24/10 |
| | | | | 455/456.1 |
| 2018/0083848 | A1 | 3/2018 | Siddiqi et al. | |

OTHER PUBLICATIONS

Cisco, "Cisco Spectrum Expert Users Guide", Software Release 4.1, Mar. 2012, 136 pages.

(Continued)

*Primary Examiner* — Angel T Brockman
(74) *Attorney, Agent, or Firm* — Edell, Shapiro & Finnan, LLC

(57) ABSTRACT

A plurality of access points located within a building structure may provide various location-based services, such as navigation, to mobile devices within the building structure. To more accurately determine the location of the plurality of access points, a floorplan of the interior of the building structure may be obtained. A plurality of images of the interior of the building structure is then obtained. At least one of the images includes an image of at least one of the plurality of access points. A plurality of reference points may also be located within the building structure and obtained. Based on the plurality of images, reference points, and the floorplan, a composite image of the interior of the structure is generated. Based on the composite image, the location of each of the plurality of access points is determined.

20 Claims, 8 Drawing Sheets

(56) References Cited

OTHER PUBLICATIONS

IndoorAtlas Ltd., "Last meter accuracy through technology fusion", Positioning technology, http://www.indooratlas.com/positioning-technology/, downloaded from the Internet on Aug. 8, 2018, 6 pages.

Mathieu Labbe et al., "Online Global Loop Closure Detection for Large-Scale Multi-Session Graph-Based SLAM", 2014 IEEE/RSJ International Conference on Intelligent Robots and Systems (IROS 2014), Sep. 14, 2018, 6 pages.

https://www.youtube.com/watch?v=AFH2yN3rM78, Stereolabs, "ZEDfu—Real-time 3D Mapping using ZED stereo camera", Jun. 21, 2016.

* cited by examiner

ABSTRACT

PRECISE ACCESS POINT PLACEMENT AND LOCATION MEASUREMENT

TECHNICAL FIELD

The present disclosure relates to determining locations of access points inside a building structure.

BACKGROUND

In order to provide wireless network connectivity inside a building structure, a plurality of access points are deployed in the building. The plurality of access points may be used to estimate a location of a mobile device located inside the building structure to provide, for example, directions to the mobile device. To accurately estimate the location of the mobile device, the location of each access point needs to be accurately determined. An inaccurate location of the access points may result in inaccurate location estimates for the mobile device.

DESCRIPTION OF EXAMPLE EMBODIMENTS

Overview

Briefly, a method and system are provided for more accurately determining a location of a plurality of access points within a building structure. The plurality of access points may provide various location-based services, such as navigation, to mobile devices within the building structure. To more accurately determine the location of the plurality of access points, a floorplan of the interior of the building structure may be obtained. A plurality of images of the interior of the building structure is then obtained. At least one of the images includes an image of at least one of the plurality of access points. A plurality of reference points may also be located within the building structure and obtained. Based on the plurality of images, reference points, and the floorplan, a composite image of the interior of the structure is generated. Based on the composite image, the location of each of the plurality of access points is determined.

Example Embodiments

Figure 1:
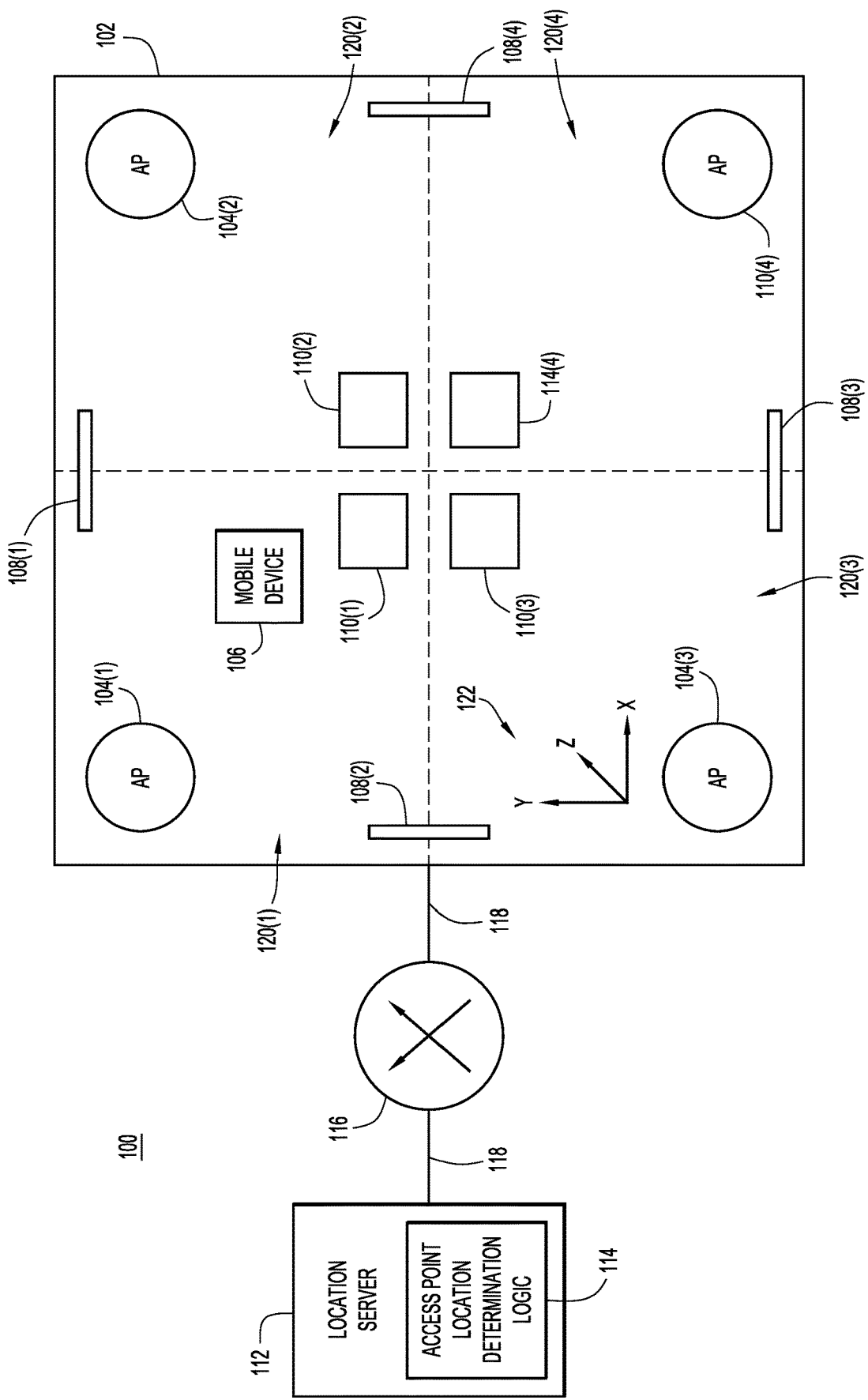
FIG. 1 is a block diagram of a system for determining a location of a plurality of access points within a building structure, according to an example embodiment.

Referring to FIG. 1, shown is a block diagram of a system 100 for determining a location of a plurality of access points within a building structure 102, according to an example embodiment. The plurality of access points are shown at 104(1)-104(4) and may be deployed within the building structure. It should be appreciated that any number of access points may be included within the building structure 102. The plurality of access points 104(1)-104(2) may be wireless access points configured to serve wireless local area network (WLAN) connectivity using IEEE 802.11 or 5G wireless communication standard technology, or other technologies hereinafter developed. Also located within the building structure 102 may be a mobile device 106. It should be appreciated that any number of mobile devices may be located within the building structure 102. The building structure 102 may also include a plurality of distinguishing features 108(1)-108(4) and a plurality of reference points 110(1)-110(4). It should be appreciated that any number of distinguishing features and reference points may be included within the building structure 102. Each of the access points 104(1)-104(2) may communicate with a server 112. The server 112 may include access point location determination logic 114, as described in greater detail herein. Each of the access points 104(1)-104(4) and the mobile device 106 may communicate with the server 112 via a network element 116, which may be, for example, a router, a switch, a gateway, etc. The plurality of access points 104(1)-104(4), the mobile device 106, the server 112, and the network element 116 may communicate with each other via communication links 118. The communication links 118 may be wired, wireless, or a combination of wired and wireless. The interior of the building structure 102 may be divided into a plurality of sub-areas 120(1)-120(4) as delineated by dashed lines. It should be appreciated that the interior of the building structure 102 may be divided into any number of sub-areas. The interior of the building structure 102 may have an associated coordinate system 122 as represented by the three-dimensional (3D) Cartesian coordinate system shown in FIG. 1.

The access point location determination logic 114 may include executable instructions that cause the server 112 to determine the location of each access point 104(1)-104(4) inside the building structure 102. To this end, the access point location determination logic 114 may divide the interior of the building structure 102 into the plurality of sub-areas 120(1)-120(4). The sub-areas 120(1)-120(4) may be either fine grain divisions or coarse grain divisions, as described in greater detail herein. A size and shape of each of the sub-areas 120(1)-120(4) may depend on multiple factors, such as the dimensions of the interior of the building structure 102, the shape of the interior of the building structure 102, and a desired maximum error for the location of each access point 104(1)-104(4) as determined by the access point location determination logic 114. For example, the larger the dimensions of the interior of the building structure 102, the larger the dimensions of each of the sub-areas 120(1)-120(4) may be. Alternatively, or additionally, the access point location determination logic 114 may divide the interior of the building structure 102 into a greater number of sub-areas when the dimensions of the interior of the building structure 102 are large. The shape of each sub-area 120(1)-120(4) may depend on the shape of the interior of the building structure 102. While the sub-areas 120(1)-120(4) are shown in FIG. 1 as being rectangular, it should be appreciated that they may be any shape. Moreover, the dimensions and shape of the sub-areas 120(1)-120(4) may depend on the desired maximum error for the determined locations of the access points 104(1)-104(4). For example, the desired maximum error may be one meter. The number, dimensions, and shape of the sub-areas 120(1)-120(4) may be determined by the access point location determination logic 114 based on the desired maximum error. It has been observed that the larger the dimensions of the sub-areas 120(1)-120(4), the larger the error in the determined locations of the access points 104(1)-104(4). Therefore, to obtain a smaller error in the determined locations of the access points 104(1)-104(4), the sub-areas 120(1)-120(4) may have smaller dimensions.

Each of the sub-areas 120(1)-120(4) may include at least one distinguishing feature 108(1)-108(4). The distinguishing feature of one sub-area may overlap with a second sub-area. For example, the distinguishing feature 108(1) overlaps with both sub-areas 120(1) and 120(2). Distinguishing feature 108(2) overlaps with both sub-areas 120(1) and 120(3). Distinguishing feature 108(3) overlaps with both sub-areas 120(3) and 120(4). Distinguishing feature 108(4) overlaps with both sub-areas 120(4) and 120(2). Distinguishing features may be features used to uniquely identify a location in the interior of the building structure 102. For example, a distinguishing feature may be a unique painting or other piece of artwork in the building. The distinguishing features 108(1)-108(4) may be used to generate a 3D image of the interior of the building structure 102 by the access point location determination logic 114, as described in greater detail herein.

Additionally, each of the sub-areas 120(1)-120(4) may include at least one reference point 110(1)-110(4), respectively. The reference points 110(1)-110(4) may also be used when generating the 3D image of the interior of the building structure 102 by the access point location determination logic 114, as described in more detail herein. The reference points 110(1)-110(4) may be points whose location within the interior of the building structure 102 is known. The locations of the reference points 110(1)-110(4) may be known from, for example, auto-cad drawings, architecture drawings, and/or precise measurements.

Once the access point location determination logic 114 has divided the interior of the building structure 102 into the sub-areas 120(1)-120(4), a wireless mobile device, such as mobile device 106, may scan the interior of the building structure 102 to generate a plurality of photographic images. For example, the mobile device 106 may fully scan a first sub-area before scanning a second sub-area. The mobile device 106 may include an inertial sensor, a camera, and/or a depth sensor. The mobile device 106 may use these components to the scan the sub-areas 120(1)-120(4). The mobile device 106 may detect revisits to a location within a sub-area using the inertial sensor, the camera, and/or the depth sensor. When scanning a sub-area, the mobile device 106 may traverse any path within the sub-area. For example, the paths may include loops within a sub-area. The loops may define a path that visits a plurality of distinguishing features. The loops may be traversed in a clockwise direction, a counter-clockwise direction, or both directions. Another example of a path is one that connects opposite edges of a perimeter of a sub-area. In another embodiment, the path may explore areas of a sub-area where the distinguishing features are as close as possible to an access point. Regardless of the path the mobile device 106 may traverse, the mobile device 106 may stop for a period of time sufficient to verify that the distinguishing features are recognized before continuing on the path. For example, the mobile device 106 may provide a notification to a user of the mobile device 106 to indicate that the distinguishing features are recognized. The images taken by the mobile device 106 may be sent to the server 112. The access point location determination logic 114 at the server 112 may use the images to generate a 3D map of the interior of the building structure 102, as described in more detail herein.

After the server 112 has received all of the images of the interior of the building structure 102 from the mobile device 106, the access point location determination logic 114 may generate a 3D map of the interior of the building structure 102 based on the images. The access point location determination logic 114 may perform post-processing on the images. For example, the access point location determination logic 114 may stitch the images together. The access point location determination logic 114 may stitch the images together based on the one or more distinguishing features in each image. For example, two images sharing one or more distinguishing features may be stitched together. Using these techniques, the access point location determination logic 114 may generate a 3D map for the interior of the building structure 102.

Next, the access point location determination logic 114 may use the reference points 110(1)-110(4) and the coordinate system 122 of the interior of the building structure 102 to scale and orient the 3D map to a floorplan of the interior of the building structure 102. The 3D map may be scaled to ensure that distances between, for example, a reference point and an access point are accurate. Moreover, the 3D map may be oriented so that correct coordinates for an access point may be determined. Because the locations of the reference points are known, the access point location determination logic 114 may scale and orient the 3D map so that locations of the reference points 110(1)-110(4) in the 3D map correspond to the locations of the reference points 110(1)-110(4) inside the building structure 102.

After the 3D map has been scaled and oriented, the access point location determination logic 114 may determine the location of each access point 104(1)-104(4) within the building structure 102. For example, the access point location determination logic 114 may determine the location of an access point by using the distance the access point is from one or more reference points, the locations of which are known. The locations of the access points may be expressed in terms of coordinates in the coordinate system 122.

Using these techniques, the locations of access points within a building structure may be determined more accurately and in less time as compared to conventional methods and systems. For example, conventional methods and systems required trained personnel to use precise measurement tools, such as laser rulers, to obtain distance measurements. The distance measurements are then overlaid on a floorplan to calculate the locations of the access points. These conventional techniques require two to three hours to calculate the location of a single wireless access point. When determining locations for access points on floors with a large number of access points, such as retail areas, airports, and casinos, the time and effort required to determine the location for each access point is high. Moreover, a floor may have many obstacles, such as many rooms or walls, which leads to mistakes when obtaining the distance measurements and calculating the locations of the access points. Additionally, conventional techniques rely on floorplans, which are often inaccurate. Floorplan inaccuracies also lead to inaccurate locations of wireless access points. In contrast, the techniques performed by the access point location determination logic 114 do not require obtaining precise measurements by trained personnel of each of the wireless access points. Therefore, the time and effort to determine the location of each wireless access point is reduced. For example, in one embodiment, the access point location determination logic 114 may determine a location for a one access point in 0.5 hours rather than the two to three hours using conventional techniques.

Figure 2:
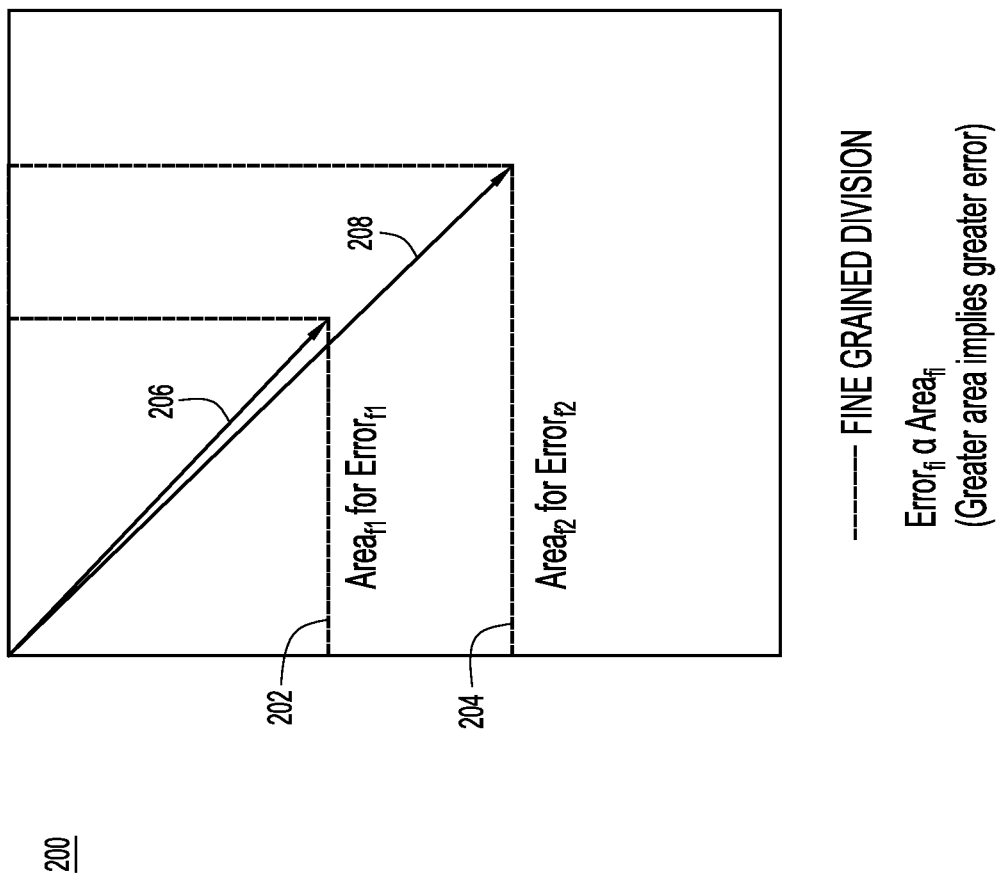
FIG. 2 is an illustration depicting a relationship between an error of determining a location of an access point and the dimensions of sub-areas in which the access point may be located, according to an example embodiment.

Turning to FIG. 2, and with continuing reference to FIG. 1, an illustration is provided depicting a relationship between an error of determining a location of an access point and the dimensions, or area, of the sub-areas, according to an example embodiment. As described above, the access point location determination logic 114 may divide an interior of the building structure into a plurality of sub-areas. The mobile device 106 may then scan each of the sub-areas 120(1)-120(4). The resulting images may be used by the access point location determination logic 114 to generate the 3D map of the interior of the building structure 102. However, it has been observed that the larger the sub-area, the more error is introduced when determining the location of the access points 104(1)-104(4). For example, an interior of a building structure 200 may be divided into a first potential sub-area 202 and a second potential sub-area 204. The error introduced by the first potential sub-area 202 when determining the location of the access points 104(1)-104(4) is indicated at 206 and the error introduced by the second potential sub-area 204 when determining the location of the access points 104(1)-104(4) is indicated at 208. It should be appreciated that the errors indicated at 206 and 208 are merely graphical representations to compare errors contributed to the determined location of the access points 104(1)-104(4). Because the second potential sub-area 204 is larger than the first potential sub-area 202, the error contributed by the second potential sub-area 204 is greater than the error contributed by the first potential sub-area 202. In other words, the error for a given sub-area may be proportional to the dimensions of the sub-area.

Figure 3A:
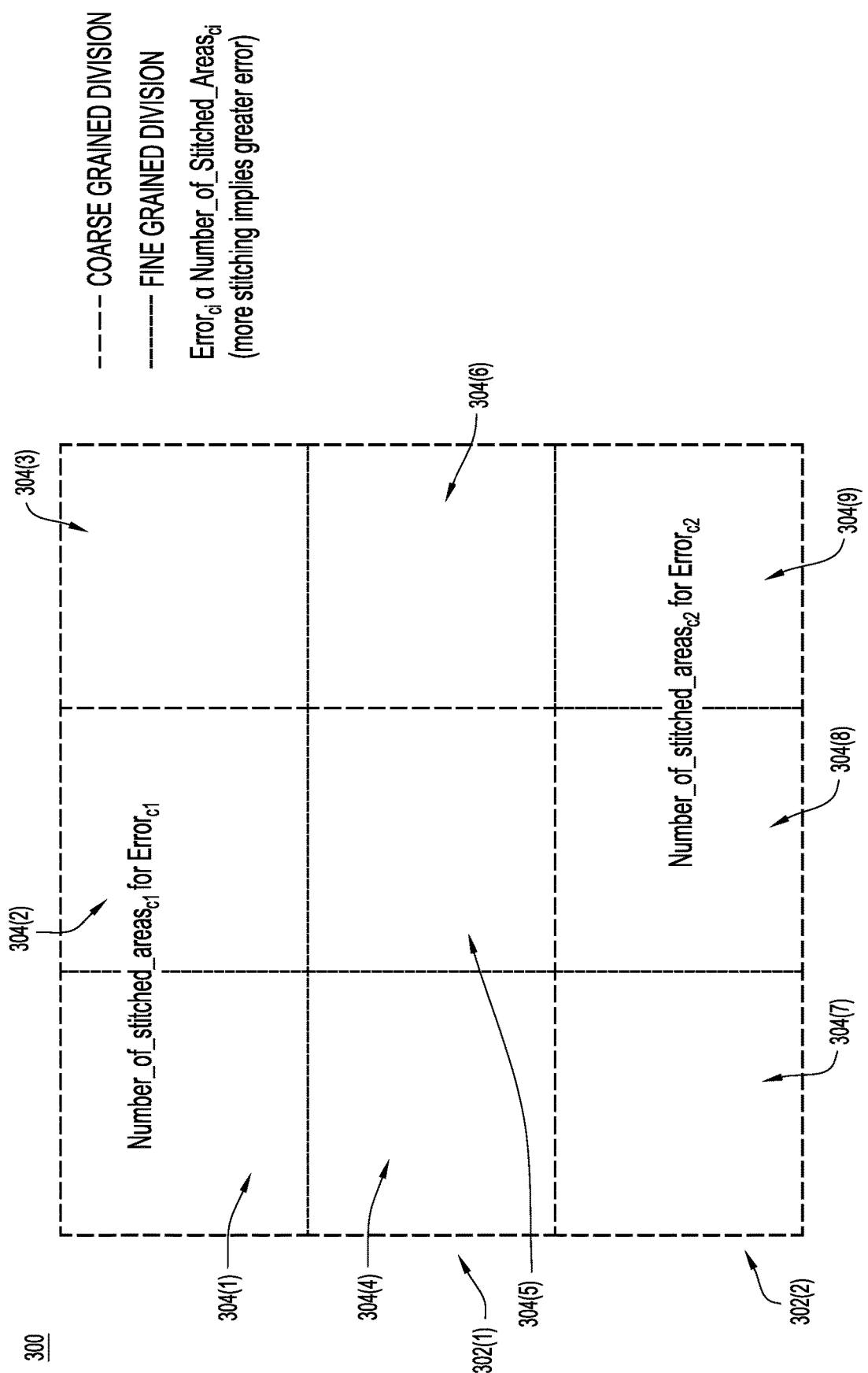
FIGS. 3A and 3B depict coarse grain divisions created to improve the accuracy of the determined locations of the access points, according to an example embodiment.
Figure 3B:
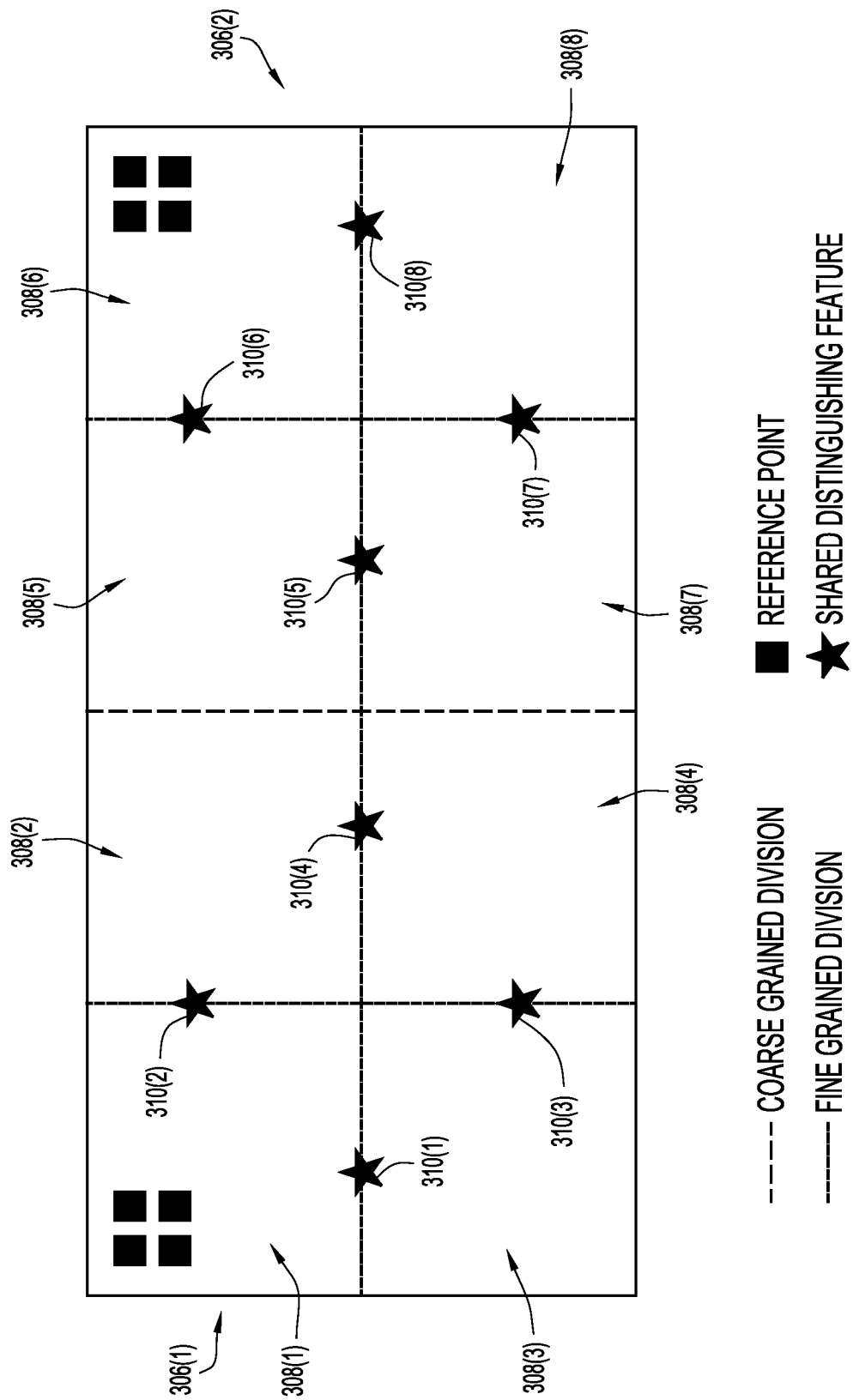

Turning to FIGS. 3A and 3B, and with continuing reference to FIG. 1, shown are coarse grain divisions created to improve the accuracy of the determined locations of the access points, according to an example embodiment. It has been observed that the error of the determined location of an access point is proportional to the number of stitched sub-areas. As described above, smaller sub-areas may introduce a smaller error when determining the locations of the access points. However, when the sub-areas are smaller, more sub-areas are needed for a given area. Because more sub-areas are needed, more stitching is required, which may lead to greater error. To mitigate this, the access point location determination logic 114 may coarsely divide an interior of the building structure.

Turning specifically to FIG. 3A, shown is an interior of a building structure 300 in which the access point location determination logic 114 creates a first coarse grain division 302(1), a second coarse grain division 302(2) as well as fine grain divisions 304(1)-304(9), according to an example embodiment. The first coarse grain division 302(1) includes fine grain divisions 304(1), 304(2), 304(4), 304(5) and the second coarse grain division includes fine grain divisions 304(1)-304(9). Because the number of stitched fine-grain sub-areas for the second coarse grain division is greater than the number of stitched fine grain sub-areas in the first coarse grain division, the error for the determined location of an access point is greater when the access point location determination logic 114 uses the second coarse grain division 302(2).

Turning next to FIG. 3B, shown is a first coarse grain division 306(1) including four fine grain sub-areas 308(1)-308(4) and a second coarse grain division 306(2) including four fine grain sub-areas 308(5)-308(8), according to an example embodiment. The first coarse grain division 306(1) includes four distinguishing features 310(1)-310(4) and the second coarse grain division 306(2) includes four distinguishing features 310(5)-310(8). The four distinguishing features 310(1)-310(4) are shared by at least two of the fine grain sub-areas 308(1)-308(4) and the four distinguishing features 310(5)-310(8) are shared by at least two of the fine grain sub-areas 308(5)-308(8). When the mobile device 106 is scanning the first coarse grain division 306(1), the mobile device 106 may scan each fine grain sub-area 308(1)-308(4) as described above in connection with FIG. 1. The access point location determination logic 114 may then stitch the images of the four fine grain sub-areas 308(1)-308(4) to generate a 3D map for the first coarse grain division 306(1). Similarly, when the mobile device 106 is scanning the second coarse grain division 306(2), the mobile device 106 may scan each fine grain sub-area 308(5)-308(8) as described in connection with FIG. 1 above. The access point location determination logic 114 may then stitch the images of the four fine grain sub-areas 308(5)-308(8) to generate a 3D map for the second coarse grain division 306(2). The access point location determination logic 114 may then stitch the 3D maps for the first coarse grain division 306(1) and the second coarse grain division 306(2) together. Using these techniques, the error contributed by the number of stitches may be reduced.

Figure 4:
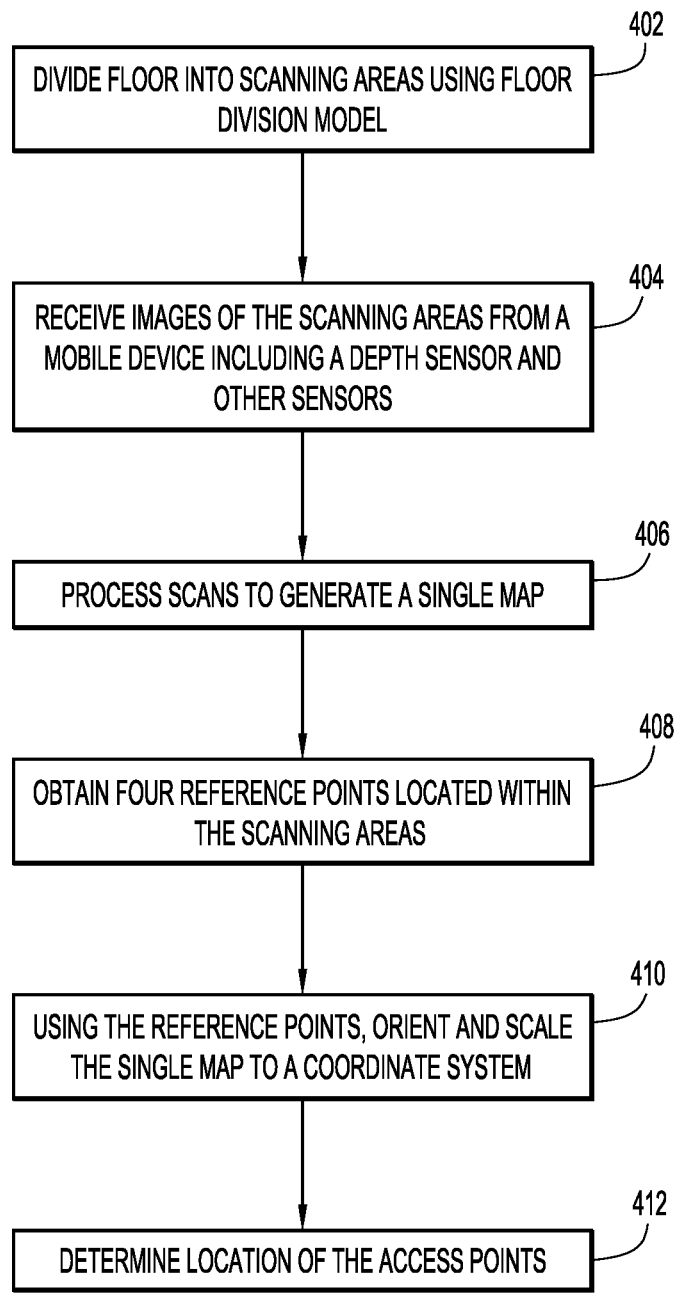
FIG. 4 is a flowchart depicting a method for determining a location of an access point within a building structure using a floor division model, according to an example embodiment.

Turning to FIG. 4, shown is a flowchart depicting a method 400 for determining a location of an access point within a building structure using a floor division model, according to an example embodiment. For example, the method 400 may be performed by the access point location determination logic 114.

At operation 402, the access point location determination logic may divide an interior of a building structure into a plurality of sub-areas, or scanning areas, for scanning by a mobile device. For example, the access point location determination logic may use a floor division model to generate the sub-areas. The floor division model may use dimensions and the shape of the interior of the building structure when generating the sub-areas. Moreover, the access point location determination logic may also use a desired maximum error for the determined locations of the access points when generating the sub-areas. For example, when the dimensions of the interior of the building structure are relatively large, the access point location determination logic may generate larger sub-areas. However, as described above, larger sub-areas may result in a larger access point location determination error. Alternatively, the access point location determination logic may generate smaller but more numerous sub-areas. However, a greater number of sub-areas may also result in a larger access point location determination error, also as described above. The access point location determination logic may determine the dimensions of the sub-areas as well as the number of sub-areas based on the desired maximum error for the determined locations of the access points. Each of the sub-areas may also include at least one distinguishing feature that may be used to generate a 3D map of the interior of the building structure, as described in greater detail herein.

At operation 404, the access point location determination logic may receive images of the sub-areas obtained by a mobile device. The mobile device may scan the sub-areas using a depth sensor, an inertial sensor, and/or a camera. The mobile device may traverse each of the sub-areas according to a path. The path may be a loop that visits one or more of the distinguishing features located within a sub-area. The loop may be traversed in a clockwise direction, a counter-clockwise direction, or both directions. Alternatively, the path may traverse the sub-area starting at one edge of the sub-area and ending at the opposite edge of the sub-area. In another aspect, the path may explore distinguishing features as close to an access point as possible. Regardless of which path is taken, the mobile device may pause to verify that the distinguishing feature is recognized. The mobile device may repeat this process for each sub-area. The access point location determination logic may then obtain the scanned images from the mobile device.

At operation 406, the access point location determination logic may process the images to generate a single map. For example, the single map may be a 3D representation of the interior of the building structure. Processing may include stitching the images together using the distinguishing features. For example, the same distinguishing feature may be present in two of the images. The access point location determination logic may then stitch these two images together as they share a distinguishing feature. The access point location determination logic may repeat this stitching process for each of the images obtained from the mobile device to generate the 3D map of the interior of the building structure.

At operation 408, the access point location determination logic may obtain a number, such as four, reference points located within the imaged areas of the interior of the building structure. The reference points may be obtained using, for example, auto-cad drawings, accurate architectural drawings, or precise measurements of points within the building structure. In one embodiment, at least one reference point is located within each sub-area.

At operation 410, the access point location determination logic may orient and scale the single map using the reference points and a coordinate system of the interior of the building structure. By scaling and orienting the single map, the single map may accurately represent the interior of the building structure.

At operation 412, the access point location determination logic may determine the location of each access point located within a building structure. For example, the access point location determination logic may obtain accurate coordinates for each access point based on the scaled and oriented map. The coordinates for the access points may be 2D or 3D coordinates.

Figure 5:
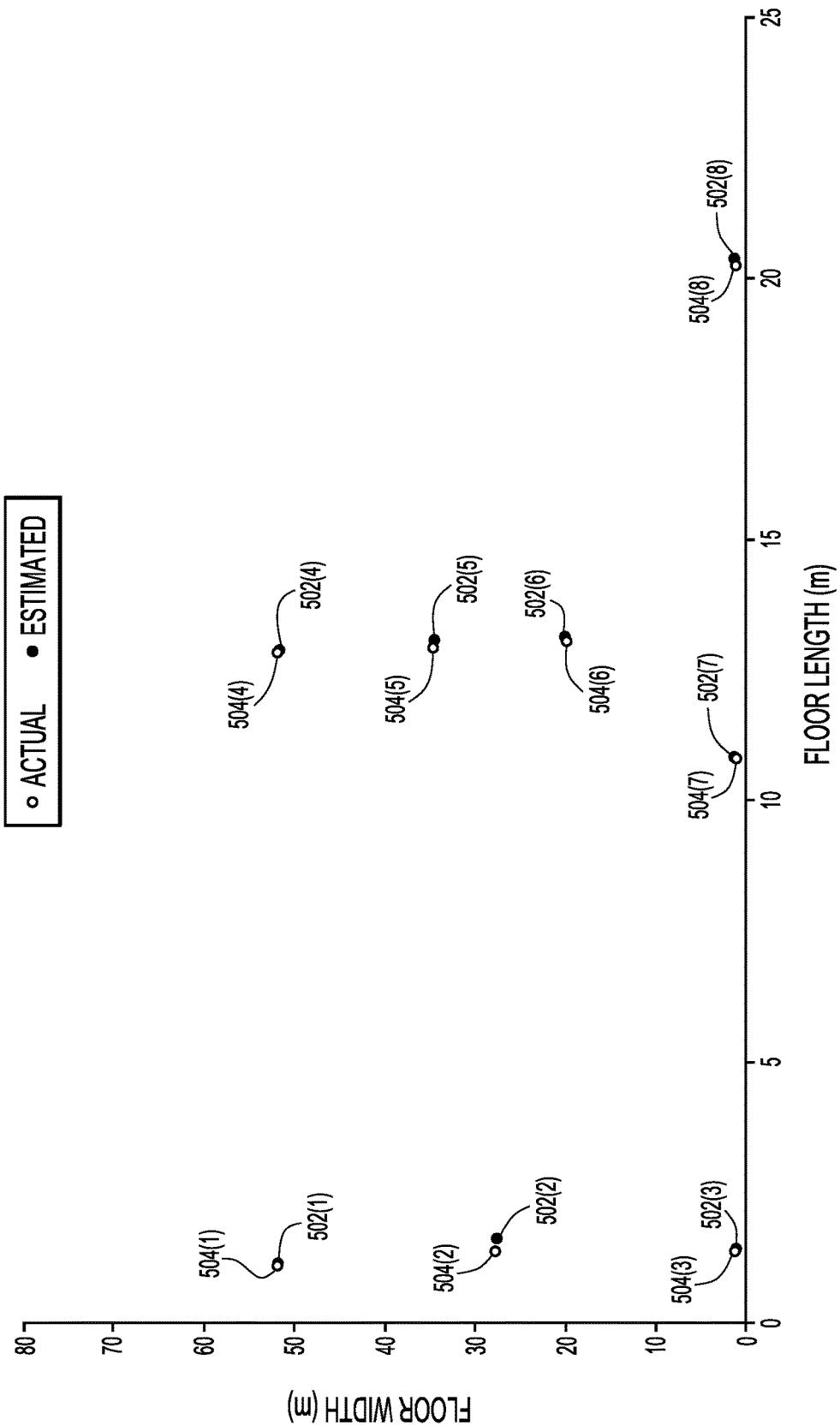
FIG. 5 shows the determined locations for access points within a building structure as compared to the actual locations of the access points, according to an example embodiment.

Turning to FIG. 5, shown are the determined locations for access points within a building structure 500 as compared to the actual locations of the access points, according to an example embodiment. The building structure 500 includes eight access points. Coordinates for each of the access points are given in terms of floor length and floor width. The actual location 502(1)-502(8) of each of the access points were determined using a tripod and a laser ruler having millimeter accuracy. However, it should be appreciated that any technique to obtain the precise, actual locations 502(1)-502(8) of the access points may be used.

The access point location determining techniques may be used to generate determined locations 504(1)-504(8) of the access points. The determined locations 504(1)-504(8) of the access points were then compared to the actual locations 502(1)-502(8), respectively, of the access points to determine the error for each access point. The error for each access point may be based on a Euclidean distance between the actual locations 502(1)-502(8) and the determined locations 504(1)-504(8) of the access points. The access point location determining techniques may determine an average error, a standard deviation, and/or a maximum error. As shown in FIG. 5, the average error is 0.14 meters, the standard deviation is 0.09 meters, and the maximum error is 0.262 meters. Accordingly, the access point location determining techniques determined the locations of the access points within a one meter error. The determined locations of the access points were within one meter of the actual locations of the access points, and the locations were determined more quickly than possible using conventional technology. For example, determining the locations for each access point according to these techniques was 0.5 hours per object. However, using conventional techniques, determining the locations for each access point is two to three hours. Therefore, these techniques result in significant time savings as well.

Figure 6:
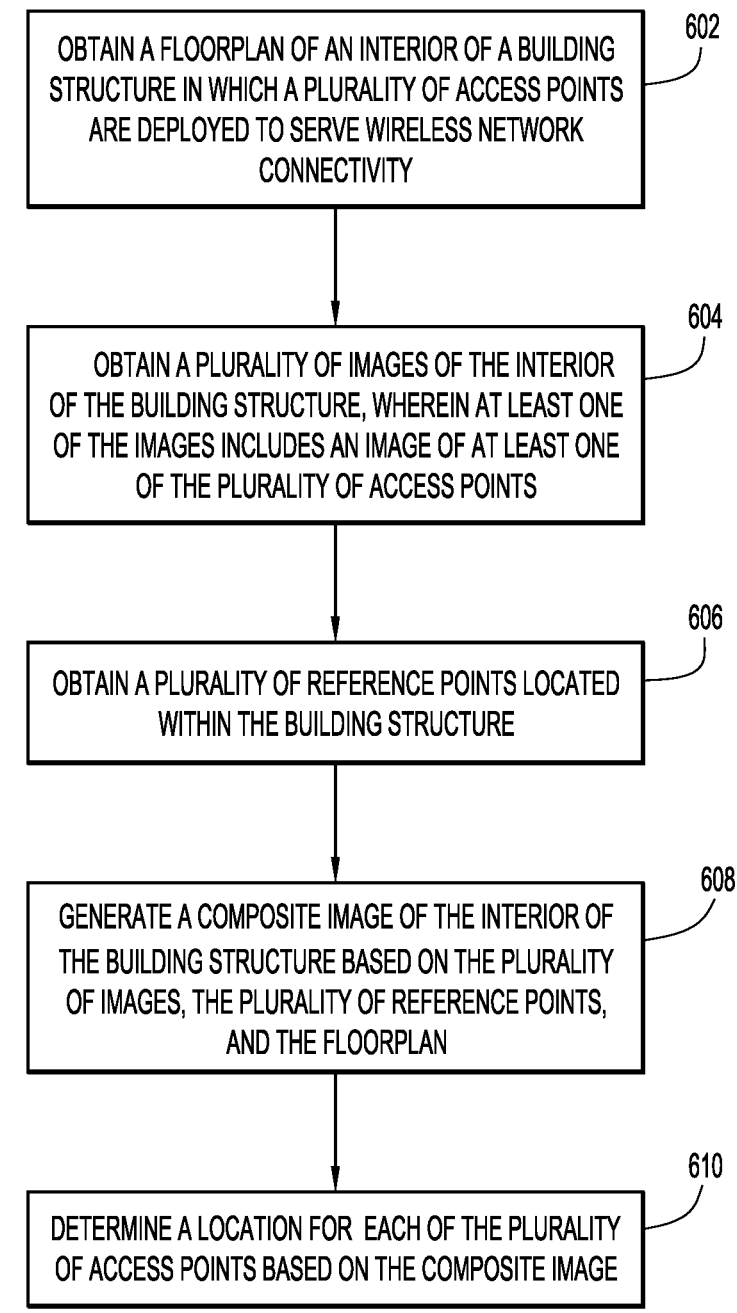
FIG. 6 is a flowchart depicting a method for determining a location of an access point within a building structure, according to an example embodiment.

Turning to FIG. 6, shown is a flowchart depicting a method 600 for determining a location of an access point within a building structure, according to an example embodiment. The method 600 may be performed by, for example, the access point location determining logic 114.

At operation 602, the access point location determining logic may obtain a floorplan of an interior of a building structure. The building structure may include a plurality of access points. The plurality of access points may serve wireless network connectivity to other devices, such as mobile devices, located within the building structure.

At operation 604, the access point location determining logic may obtain a plurality of images of the interior of the building structure. At least one of the plurality of images includes at least one of the plurality of access points located within the building structure.

At operation 606, the access point location determining logic may obtain a plurality of reference points located within the building structure. The reference points may have known, accurate location coordinates. For example, the reference points may be obtained from an auto-cad drawing, accurate architectural drawings, and/or precise measurements.

At operation 608, the access point location determining logic may generate a composite image of the interior of the building structure based on the images, the reference points, and the floorplan. For example, the composite image may be a 3D map. The access point location determining logic may stitch the images together to generate the composite image. The composite image may then be oriented and scaled to the floorplan using the reference points as well as an associated coordinate system for the interior of the building structure. Using these techniques, the composite image closely approximates the actual interior of the building structure.

At operation 610, the access point location determining logic may determine a location for each of the access points based on the composite image. Because the composite image has been oriented and scaled according to the reference points and the coordinate system for the interior of the building structure, the access point location determining techniques may generate accurate coordinates for each of the access points.

Figure 7:
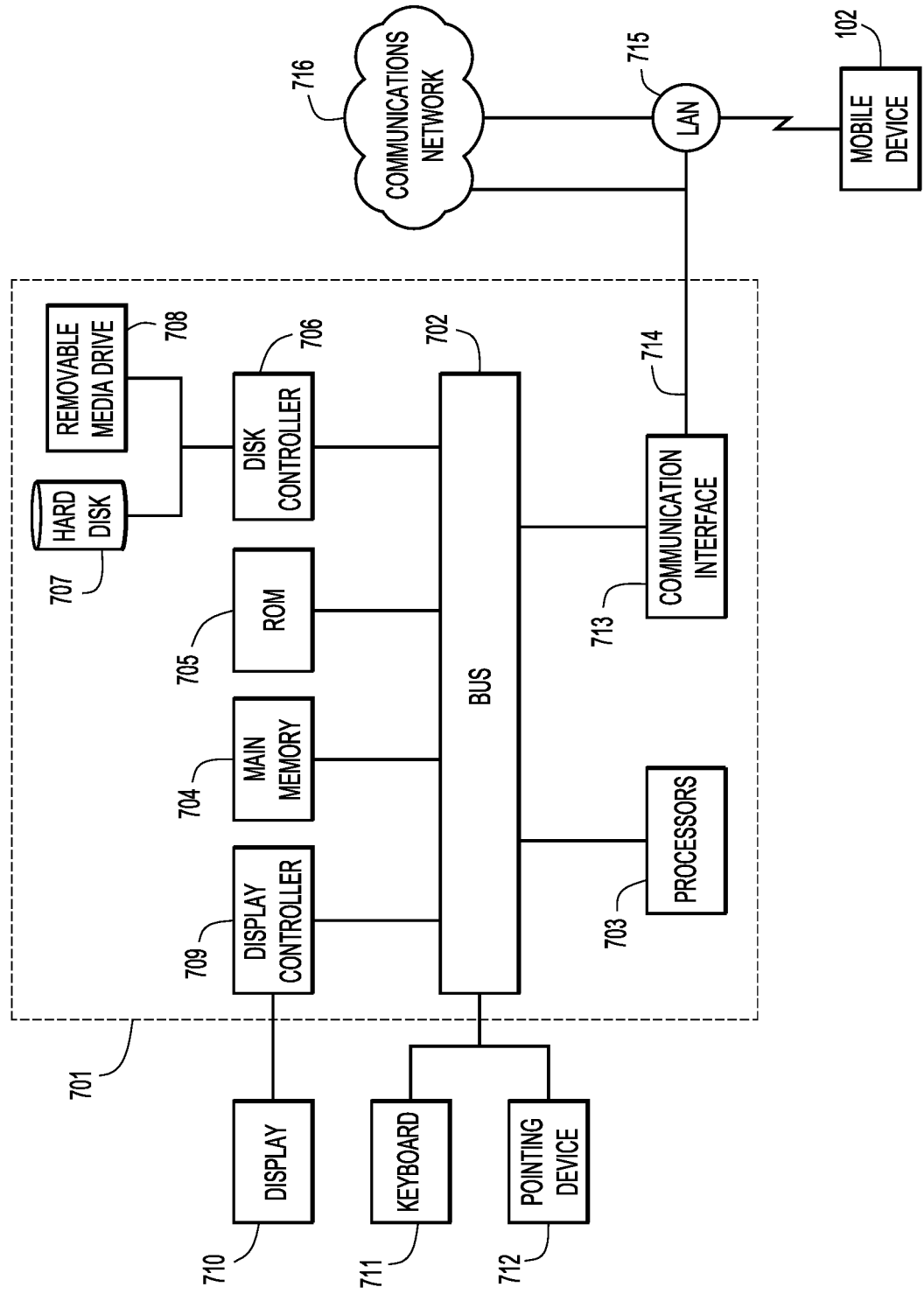
FIG. 7 is a block diagram showing a server configured to perform the access point location determining techniques, according to an example embodiment.

FIG. 7 is a block diagram showing a server, e.g., server 112 shown in FIG. 1, configured to perform the access point location determining techniques, according to an example embodiment. FIG. 7 illustrates a computer system 701 upon which the embodiments presented may be implemented. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., read-only compact disc drive, read/write compact disc drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT), for displaying information to a computer user. The computer system 701 includes input devices, such as a keyboard 711 and a pointing device 712, for interacting with a computer user and providing information to the processor 703. The pointing device 712, for example, may be a mouse, a trackpad, or a trackball for communicating direction information and command selections to the processor 703 and for controlling cursor movement on the display 710.

The computer system 701 performs a portion or all of the processing steps of the process in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other optical medium, or any other medium from which a computer can read.

Stored on any one or on a combination of non-transitory computer readable storage media, embodiments presented herein include software for controlling the computer system 701, for driving a device or devices for implementing the process, and for enabling the computer system 701 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. The computer system 701 can transmit and receive data, including program code, through the network(s) 715 and 716, the network link 714 and the communication interface 713. Moreover, the network link 714 may provide a connection through a LAN 715 to an access point.

In summary, a method for more accurately determining a location of a plurality of access points within a building structure is provided. The method includes obtaining a floorplan of an interior of a building structure in which a plurality of access points are deployed to serve wireless network connectivity. Additionally, a plurality of images of the interior of the building structure is obtained. At least one of the images includes an image of at least one of the plurality of access points. A plurality of reference points located within the building structure is also obtained. Based on the plurality of images, the plurality of reference points, and the floorplan, a composite image of the interior of the building structure may be generated. Based on the composite image, a location for each of the plurality of access points is determined.

In another embodiment, the floorplan has an associated coordinate system. The method then includes orienting the composite image of the interior of the building structure with the associated coordinate system.

In another aspect, the floorplan has an associated scale. The method then includes scaling the composite image of the interior of the building structure according to the scale of the floorplan.

In yet another embodiment, each of the plurality of images includes at least one distinguishing feature. The composite image is then generated based on the at least one distinguishing feature.

In yet another aspect, the floorplan of the interior of the building structure is divided into a plurality of sub-areas. The plurality of images includes at least one image for each of the plurality of sub-areas.

In another embodiment, each sub-area includes at least one of the reference points.

In another aspect, the plurality of images are photographic images obtained by a mobile device traversing a looped path within each sub-area.

In another embodiment, the location for each of the plurality of access points is based on a coordinate system associated with the floorplan.

In another embodiment, an apparatus includes a communication interface configured to enable network communications and a processing device coupled with the communication interface. The processing device is configured to obtain a floorplan of an interior of a building structure in which a plurality of access points are deployed to serve wireless network connectivity, obtain a plurality of images of the interior of the building structure, wherein at least one of the images includes an image of at least one of the plurality of access points, and obtain a plurality of reference points located within the building structure. Based on the plurality of images, the plurality of reference points, and the floorplan, the processor is configured to generate a composite image of the interior of the building structure. Then the processor determines a location for each of the plurality of access points based on the composite image.

In yet another embodiment, one or more non-transitory computer readable storage media is encoded with instructions that, when executed by a processor, cause the processor to obtain a floorplan of an interior of a building structure in which a plurality of access points are deployed to serve wireless network connectivity. The processor also obtains a plurality of images of the interior of the building structure, wherein at least one of the images includes an image of at least one of the plurality of access points and obtains a plurality of reference points located within the building structure. Further, the instructions cause the processor to generate a composite image of the interior of the building structure based on the plurality of images, the plurality of reference points, and the floorplan. Based on the composite image, the processor determines a location for each of the plurality of access points.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    obtaining a floorplan of an interior of a building structure in which a plurality of access points are deployed to serve wireless network connectivity;
    obtaining a plurality of images of the interior of the building structure, wherein at least one of the images includes an image of at least one of the plurality of access points;
    obtaining a plurality of reference points located within the building structure;
    generating a composite image of the interior of the building structure based on the plurality of images, the plurality of reference points, and the floorplan; and
    determining a location for each of the plurality of access points based on the composite image.

2. The method of claim 1, wherein the floorplan has an associated coordinate system, and wherein generating the composite image further comprises:
    orienting the composite image of the interior of the building structure with the associated coordinate system.

3. The method of claim 2, wherein the floorplan has an associated scale, and wherein generating the composite image further comprises:
    scaling the composite image of the interior of the building structure according to the scale of the floorplan.

4. The method of claim 1, wherein each of the plurality of images includes at least one distinguishing feature, and wherein the composite image is generated based on the at least one distinguishing feature.

5. The method of claim 1, wherein the floorplan of the interior of the building structure is divided into a plurality of sub-areas, and wherein the plurality of images includes at least one image for each of the plurality of sub-areas.

6. The method of claim 5, wherein each sub-area includes at least one of the reference points.

7. The method of claim 5, wherein the plurality of images are photographic images obtained by a mobile device traversing a looped path within each sub-area.

8. The method of claim 1, wherein the location for each of the plurality of access points is based on a coordinate system associated with the floorplan.

9. An apparatus comprising:
    a communication interface configured to enable network communications; and a processing device coupled with the communication interface, and configured to:
  obtain a floorplan of an interior of a building structure in which a plurality of access points are deployed to serve wireless network connectivity;
  obtain a plurality of images of the interior of the building structure, wherein at least one of the images includes an image of at least one of the plurality of access points;
  obtain a plurality of reference points located within the building structure;
  generate a composite image of the interior of the building structure based on the plurality of images, the plurality of reference points, and the floorplan; and
  determine a location for each of the plurality of access points based on the composite image.

10. The apparatus of claim 9, wherein the floorplan has an associated coordinate system, and wherein the processing device is further configured to:
  orient the composite image of the interior of the building structure with the associated coordinate system.

11. The apparatus of claim 10, wherein the floorplan has an associated scale, and wherein the processing device is further configured to:
  scale the composite image of the interior of the building structure according to the scale of the floorplan.

12. The apparatus of claim 9, wherein each of the plurality of images includes at least one distinguishing feature, and wherein the composite image is generated based on the at least one distinguishing feature.

13. The apparatus of claim 9, wherein the floorplan of the interior of the building structure is divided into a plurality of sub-areas, and wherein the plurality of images includes at least one image for each of the plurality of sub-areas.

14. The apparatus of claim 13, wherein each sub-area includes at least one of the reference points.

15. The apparatus of claim 13, wherein the plurality of images are photographic images obtained by a mobile device traversing a looped path within each sub-area.

16. The apparatus of claim 9, wherein the location for each of the plurality of access points is based on a coordinate system associated with the floorplan.

17. One or more non-transitory computer readable storage media encoded with instructions that, when executed by a processor, cause the processor to:
  obtain a floorplan of an interior of a building structure in which a plurality of access points are deployed to serve wireless network connectivity;
  obtain a plurality of images of the interior of the building structure, wherein at least one of the images includes an image of at least one of the plurality of access points;
  obtain a plurality of reference points located within the building structure;
  generate a composite image of the interior of the building structure based on the plurality of images, the plurality of reference points, and the floorplan; and
  determine a location for each of the plurality of access points based on the composite image.

18. The one or more non-transitory computer readable storage media of claim 17, wherein the floorplan has an associated coordinate system, and the instructions further cause the processor to:
  orient the composite image of the interior of the building structure with the associated coordinate system.

19. The one or more non-transitory computer readable storage media of claim 18, wherein the floorplan has an associated scale, and wherein the instructions further cause the processor to:
  scale the composite image of the interior of the building structure according to the scale of the floorplan.

20. The one or more non-transitory computer readable storage media of claim 17, wherein each of the plurality of images includes at least one distinguishing feature, and wherein the composite image is generated based on the at least one distinguishing feature.

* * * * *